(12) United States Patent
Padmanabhuni et al.

(10) Patent No.: US 8,881,146 B2
(45) Date of Patent: Nov. 4, 2014

(54) SYSTEM FOR CONFIGURING A VIRTUAL IMAGE INSTANCE INCLUDING RECEIVING A CONFIGURATION FILE SPECIFYING SOFTWARE INFORMATION CORRESPONDING TO A DESIRED INSTANCE OF A NETWORKED NODE OR CLUSTER

(75) Inventors: Srinivas Padmanabhuni, Bangalore (IN); Allahbaksh M. Asadullah, Hubli (IN); Basava M. Raju, Bangalore (IN)

(73) Assignee: Infosys Limited, Bangalore (IN)

( * ) Notice: Subject to any disclaimer, the term of this patent is extended or adjusted under 35 U.S.C. 154(b) by 93 days.

(21) Appl. No.: 13/336,369

(22) Filed: Dec. 23, 2011

(65) Prior Publication Data

US 2013/0104126 A1 Apr. 25, 2013

(30) Foreign Application Priority Data

Oct. 24, 2011 (IN) .............................. 3627/CHE/2011

(51) Int. Cl.
*G06F 9/455* (2006.01)
*G06F 12/00* (2006.01)
*G06F 9/44* (2006.01)
*G06F 9/445* (2006.01)

(52) U.S. Cl.
CPC .. *G06F 9/45558* (2013.01); *G06F 2009/45562* (2013.01)
USPC ............... 718/1; 717/178; 717/176; 717/120; 717/121; 711/173

(58) Field of Classification Search
None
See application file for complete search history.

(56) References Cited

U.S. PATENT DOCUMENTS 7,386,698 B2 * 6/2008 Gimpl et al. .................. 711/173
2008/0163171 A1 * 7/2008 Chess et al. .................... 717/120

OTHER PUBLICATIONS

Konstantinous et al; An Architecture for Virtual Solution Composition and Deployment Infrastructure cloud, VTDC'09, Jun. 15, 2009.*
Krsul et al; VMPlants: Providing and Managing Virtual Machine Execution Environments for Grid Computing, IEEE, 2004.*
Goscinski et al., Toward dynamic and attribute based publication, discovery and selection for cloud computing, Future Generation Computer Systems 26 (2010) 947-970.
Amazon Web Services, Amazon EC2 FAQS, aws.amazon.com/ec2/faqs/.
Amazon Web Services, Amazon EC2 Instances Now Can Boot from Amazon EBS, aws.amazon.com/about-aws/whats-new/2009/12/03/amazon-ec2-instances-now-can-boot-from-amazon-ebs/.
Wang et al., Cloud Computing: a Perspective Study, Dec. 1, 2008, pp. 1-11.

* cited by examiner

*Primary Examiner* — Meng An
*Assistant Examiner* — Bing Zhao
(74) *Attorney, Agent, or Firm* — Stephen M. Hertzler; Marc S. Kaufman; Reed Smith LLP

(57) ABSTRACT

A method and apparatus for creating a machine image to be used in instantiating virtual nodes in a cloud computing environment. A virtual machine operating system image is created based on the configuration file. The machine operating system image is loaded in the cloud environment as a machine instance. An EBS disk is created based on the configuration file, and the EBS disk is attached to the machine instance. The method and apparatus allow software to be provisioned on the fly merely by being specified in the configuration file, which can be an XML file or other declarative document.

15 Claims, 4 Drawing Sheets

PRIOR ART

Fig. 4

```
<softwares>
    <software>
        <name>Name of Software</name>
        <ver>Version No</ver>
        <link>Link of Software (S3/Warlus )</link>
        <config>
            <name>ConfigParam1</name>
            <value>Value of above ConfigParam</name>
            <name>ConfigParam2</name>
            <value>Value of above ConfigParam2</name>
        </config>
    </software>
    <software>
        .
    </software>
</softwares>
<data>
    <name>
        <location>Location inS3</location>
        <compressed>True/False</compressed>
        <store>Location where the data should be stored</store>
    </name>
    .
</data>
```

100

SYSTEM FOR CONFIGURING A VIRTUAL IMAGE INSTANCE INCLUDING RECEIVING A CONFIGURATION FILE SPECIFYING SOFTWARE INFORMATION CORRESPONDING TO A DESIRED INSTANCE OF A NETWORKED NODE OR CLUSTER

RELATED APPLICATION DATA

This application claims priority to Indian Patent Application No. 3627/CHE/2011, filed Oct. 24, 2011, which is hereby incorporated by reference in its entirety.

FIELD OF THE INVENTION

The invention relates to creating virtual machine images for instantiating virtual machines in a cloud computing environment.

BACKGROUND

"Cloud computing" is an emerging paradigm in which various computing resources are offered over a network, such as the Internet, as scalable services. As an example, the Amazon™ Elastic Computing Cloud (EC2) is a web service that provides scalable compute capacity over the internet. A user of EC2 can create one or more virtual machines and host various requirements within the virtual machines.

Cloud computing provides computation, software, data access, and storage services that do not require the user to be concerned with the physical location, maintenance, and configuration of the system that delivers the services. Cloud computing paradigms can provide scalable and perpetual IT services. Users of cloud computing services can increase capacity or add capabilities on the fly without investing in new infrastructure, training new personnel, or licensing new software. Cloud computing typically is a delivery model for IT services based on Internet protocols, and it typically involves provisioning of dynamically scalable and virtualized devices, i.e., nodes.

Cloud computing services may take the form of web-based tools or applications that users can access and use through a web browser or console as if the programs were installed locally on their own computers. Software and data can be stored on servers at remote, and even unknown, locations. Most cloud computing environments provide services delivered through shared data-centers and appearing as one or more points of access for consumers of the service.

As illustrated in FIG. 1, a cloud computing service 20 can include various services, such as storage service 12, compute service 14, and software service 16 as well as other services. Each of these services is available for configuring one or more virtual machines by client device 10. Cloud computing services allow users to configure virtual machines while reducing overhead, as all overhead is managed by the cloud service provider. Users ordinarily pay for the cloud service based on some computing unit as a metric of resources used over time. For example, payment can be based on the number of users, time of use, required resources, and the like.

In a cloud computing environment, virtual machines are created using "machine images", such as the Amazon™ Machine Image (AMI). A machine image is a virtual appliance which is used to instantiate a virtual machine. The machine image can include a read only file system image which includes an operating system and any additional software required to deliver a service and data. The operating system and the software are stored in the machine image in an installed format and are then used to instantiate a virtual machine.

When a user desires to start a virtual machine, the user specifies the appropriate machine image which is then used by the service to create a virtual machine instance. The instance will have the operating system and all the necessary software, which were bundled up in the machine image as described above.

When starting a virtual machine, a user can use an existing machine image if the user's needs correspond substantially to the operating system and software stored in an existing machine image. However, if a user has different needs, the user will first have to load a plain image with the basic operating system and then install the necessary software/data into the image to create the desired machine image. Creating a machine image is time consuming. Various user communities have created and stored many machine images covering a variety of software combinations. However, there are always new needs that require a new machine image. Also, storing the machine images requires a great deal of storage resources and corresponding financial resources to pay for the storage resources.

BRIEF DESCRIPTION OF THE DRAWING

The invention is described through examples and the attached drawing in which:

FIG. 4 is an example of a configuration document.

While systems and methods are described herein by way of example and embodiments, those skilled in the art recognize that the systems and methods are not limited to the embodiments or drawings described. It should be understood that the drawings and description are not intended to be limiting to the particular form disclosed. Rather, the intention is to cover all modifications, equivalents and alternatives falling within the spirit and scope of the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

The disclosed embodiments reduce the need for storage of multiple machine images by providing a technical mechanism for the user to specify software/data details for a virtual machine in a declarative document, such as an XML document. A new machine image can be constructed on the fly based on the declarative document. Instead of creating and storing multiple machine images, one for each of the user's needs, the user merely needs to create and maintain the declarative documents. Such documents require greatly reduced efforts and recourses to create and store as compared to machine images. The "user" need not be the person that will use the cloud computing services. Accordingly, the term "user" herein refers to a person or entity that is providing instructions to the computing system.

Figure 1:
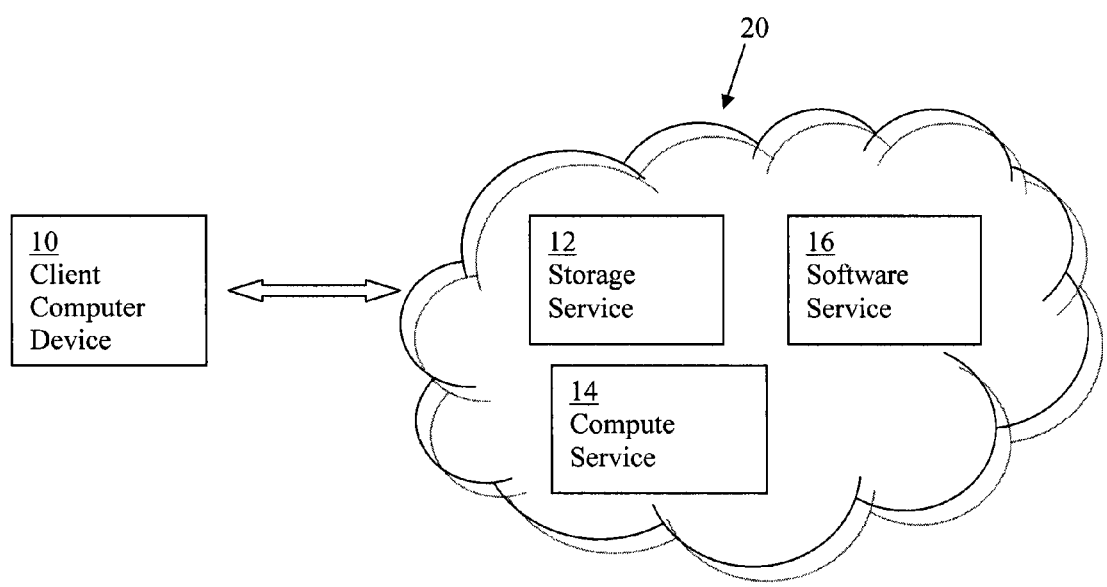
FIG. 1 is a schematic representation of a cloud computing architecture.
Figure 2:
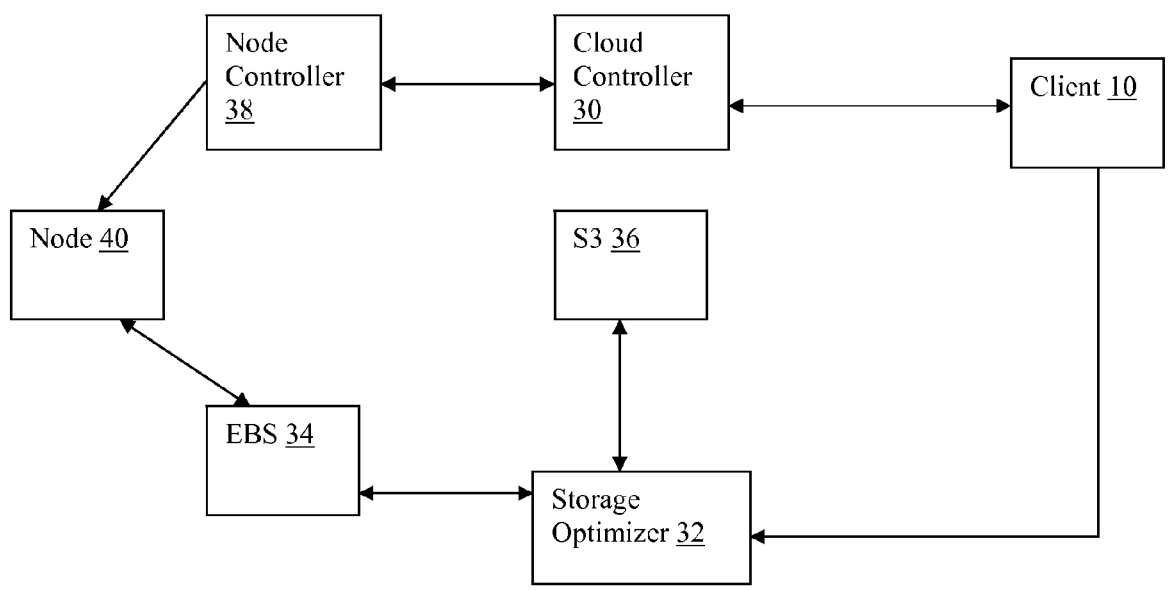
FIG. 2 is a schematic representation of an architecture of an embodiment for provisioning a virtual machine.

FIG. 2 illustrates a computer architecture of an embodiment. The system receives requests for instantiating a virtual machine, and other information as described below, from client device 10 of a user. Cloud controller 30 is a server which manages operation of the cloud environment in a known manner. Storage optimizer 32 is a machine in the cloud computing environment that runs on the same VLAN as node 40 (described below), reads the declarative document, attaches itself to a storage device such as the EBS 34 described below, downloads software from a storage service, such as S3 36 described below, and puts the software in the proper format in the storage device. A "VLAN" is a virtual local area network, i.e. a group of hosts with common requirements that communicate as if they are attached to the same domain.

EBS 34 is the Elastic Block Storage provided by Amazon™. EBS 34 is service that provides raw block devices that can be attached to a virtual machine. The block devices can include a formatted and mounted file system. While EBS is used in this example, any similar service can be used. S3 36 is the Simple Storage Service provided by Amazon™. However, any storage service can be used. Node controller 38 provides control for nodes in a known manner, including checking availability of a compute node. Node 40 is the virtual machine or cluster of virtual machines to be instantiated.

Each element described above can be implemented as software executed by the processor of a general purpose computing device or multiple computing devices, such as servers, PCs, tablets, mobile devices, and the like. Any appropriate networking infrastructure and protocols can be used. For example, communications between devices can be accomplished using TCP/IP.

Figure 3:
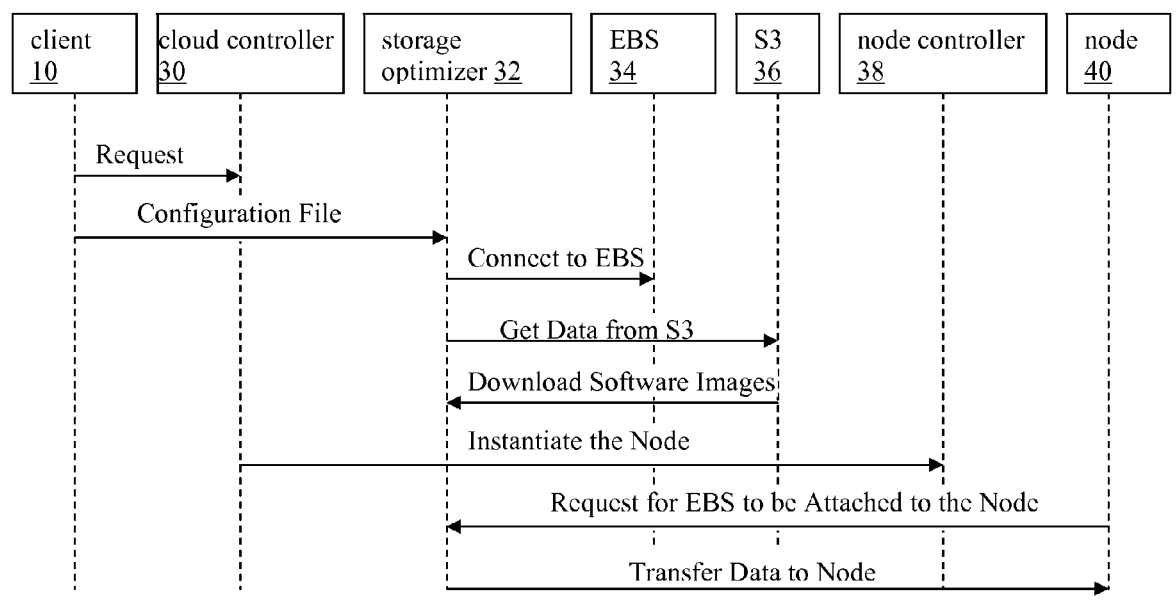
FIG. 3 is a communications flow diagram.

FIG. 3 illustrates an example of the novel communications flow of the architecture of FIG. 2 for instantiating a virtual machine in a cloud computing environment, such as an EC2 environment. When a user desires to instantiate node 40, client 10 sends a request, including an authentication request, to cloud controller 30. The request can also include information such as the operating system machine image to be loaded, RAM configuration, security information, key files, and other desired information. Client 10 also sends a configuration file to storage optimizer 32. The configuration file specifies software information such as the desired software for node 40. In this example, the configuration file is a declarative file in the XML format. The configuration file is discussed in more detail below with respect to FIG. 4.

Storage optimizer 32 then connects to EBS 34 and downloads software images from S3 36 specified by the configuration file. In the case of a partial update of node 40, only the delta will be downloaded. Cloud controller 30 then instantiates node 40 through node controller 38 and EBS 34 is attached to node 40. Finally, all necessary data is transferred to node 40.

In the process described above, a virtual machine operating system image is created based on the configuration file. The machine operating system image is loaded in the cloud environment as a machine instance. An EBS disk is created based on the configuration file, and the EBS disk is attached to the machine instance.

The user does not need to create the image. The user can pass the XML file to the storage controller along with image needs based on which storage controller can handle the needs, such as image creation, ABS creation and attaching the same to the created image. The controller can be accessed through web services or through other mechanisms such as Secured File Transfer Protocol.

As discussed earlier, XML file is the center point of the overall approach. The XML files can be maintained for all the necessary softwares having the necessary dependent software details for each of the software. For example, Apache_Tomcat.xml will have the version details of the Tomcat and where it can be found in S3 and also the details of Java and its version Tomcat is dependent on. Whenever a new version of Tomcat arrives, one needs to maintain only the differential portion (new and modified files) in S3 and also the corresponding difference in XML, including the necessary Java dependencies. Later when Tomcat is to be upgraded from one version to another version, the diff.xml file can be used over existing Tomcat in the EBS accordingly. The same can be applied to data too. In Cloud environment, the users store data in S3 or in EBS volumes based on their need. If the data needs to be shared between the images or the data needs to be maintained incrementally, the XML based approach can be used. The user can specify the data location in S3 to copy from and the same can be copied to the EBS volume as the image gets created in our approach.

FIG. 4 illustrates an example of a configuration document 100. Configuration document 100 is in the XML format and is a declarative document that specifies software applications and other parameters. The <software> tag, and it subordinate tags, designates an element indicating the software application name, link/location, configuration parameters and parameter values, for example. The <data> tag, and its subordinate tags, designates data name location and other information. As noted above, this document is used to specify software and other resources to be loaded in the virtual machine. Configuration document 100 can include any data which facilitates the functions described above.

Embodiments have been disclosed herein. However, various modifications can be made without departing from the scope of the embodiments as defined by the appended claims and legal equivalents.

The invention claimed is:

1. A method for configuring a virtual image instance in a plurality of networked nodes or clusters, comprising:
    receiving, at a storage optimizer, a configuration file, in XML or another markup language that defines a set of rules for encoding description of data in one or more documents, specifying software information corresponding to a desired virtual machine instance that is to be instantiated on a node or cluster of the plurality of networked nodes or clusters that is prepared by a cloud controller, the software information including an IP address of a first service that provides raw block devices configured to attach to a virtual machine;
    connecting, by the storage optimizer, to the first service by utilizing the IP address provided in the configuration file;
    downloading, by the storage optimizer, from a storage service to the first service, software and data images specified by the configuration file;
    disconnecting the storage optimizer from the first service following completion of the download; and
    connecting the first service to the node or cluster and transferring, by the first service, the software and data images to the node or cluster.

2. The method of claim 1, wherein the first service is the Elastic Block Storage provided by Amazon™.

3. The method of claim 2, wherein the storage service is the Simple Storage Service provided by Amazon™.

4. The method of claim 3, wherein, when a new version of software is available, only new or modified files are downloaded.

5. The method of claim 3, wherein the configuration file specifies software application name, link/location, configuration parameters, configuration values, and data name location.

6. A computer apparatus for configuring a virtual image instance in a plurality of networked nodes or clusters, comprising:
- a processor; and
- a memory operatively coupled to the processor and containing instructions that, when executed by the processor, cause the processor to carry out the steps of:
  - receiving, at a storage optimizer, a configuration file, in XML or another markup language that defines a set of rules for encoding description of data in one or more documents, specifying software information corresponding to a desired virtual machine instance that is instantiated on a node or cluster of the plurality of networked nodes or clusters that is prepared by a cloud controller, the software information including an IP address of a first service that provides raw block devices configured to attach to a virtual machine,
  - connecting, by the storage optimizer, to the first service by utilizing the IP address provided in the configuration file,
  - downloading, by the storage optimizer, from a storage service to the first service, software and data images specified by the configuration file,
  - disconnecting the storage optimizer from the first service following completion of the download, and
  - connecting the first service to the node or cluster and transferring, by the first service, the software and data images to the node or cluster.

7. The apparatus of claim 6, wherein the first service is the Elastic Block Storage provided by Amazon™.

8. The apparatus of claim 7, wherein the storage service is the Simple Storage Service provided by Amazon™.

9. The apparatus of claim 8, wherein, when a new version of software is available, only new or modified files are downloaded.

10. The apparatus of claim 8, wherein the configuration file specifies software application name, link/location, configuration parameters, configuration values, and data name location.

11. Non-transitory computer readable storage media having instructions recorded thereon that, when executed by a processor, cause the processor to carry out a method comprising the steps of:
- receiving, at a storage optimizer, a configuration file, in XML or another markup language that defines a set of rules for encoding description of data in one or more documents, specifying software information corresponding to a desired virtual machine instance that is to be instantiated on a node or cluster of the plurality of networked nodes or clusters that is prepared by a cloud controller, the software information including an IP address of a first service that provides raw block devices configured to attach to a virtual machine;
- connecting, by the storage optimizer, to the first service by utilizing the IP address provided in the configuration file;
- downloading, by the storage optimizer, from a storage service to the first service, software and data images specified by the configuration file;
- disconnecting the storage optimizer from the first service following completion of the download; and
- connecting the first storage service to the node or cluster and transferring, by the first service, the software and data images to the node or cluster.

12. The media of claim 11, wherein the first service is the Elastic Block Storage provided by Amazon™.

13. The media of claim 12, wherein the storage service is the Simple Storage Service provided by Amazon™.

14. The media of claim 13, wherein, when a new version of software is available, only new or modified files are downloaded.

15. The media of claim 13, wherein the configuration file specifies software application name, link/location, configuration parameters, configuration values, and data name location.

\* \* \* \* \*